Nov. 16, 1948.    H. B. DRAPEAU    2,454,141
THERMOSTATIC LIQUID CONTROLLING DEVICE
Original Filed May 2, 1939
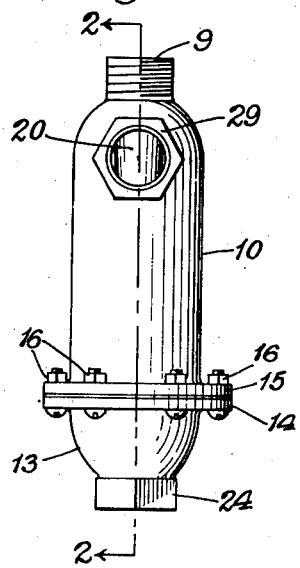
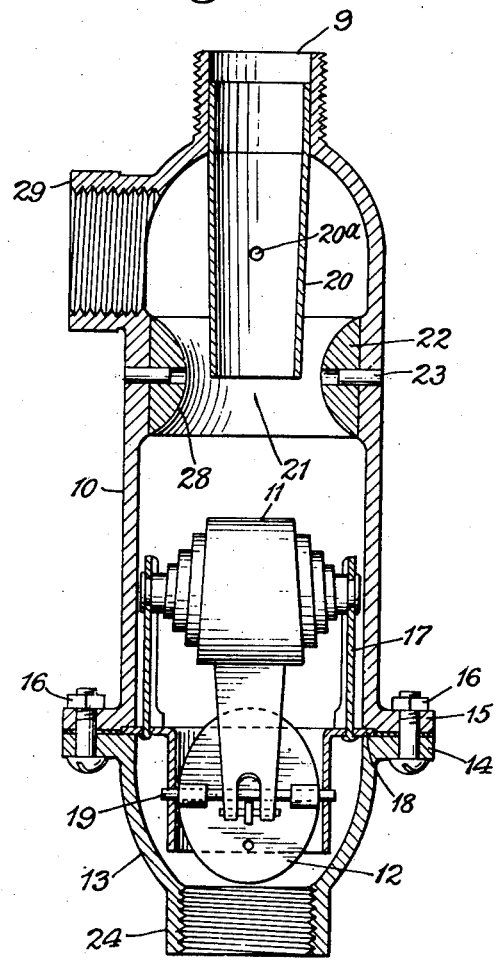
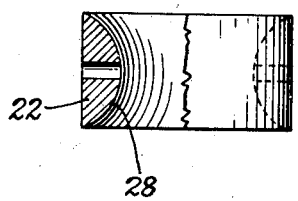
Inventor
Harold B. Drapeau
by Parker & Carter
Attorneys.

Patented Nov. 16, 1948

2,454,141

UNITED STATES PATENT OFFICE 2,454,141

THERMOSTATIC LIQUID CONTROLLING DEVICE

Harold B. Drapeau, Oak Park, Ill., assignor to The Dole Valve Company, Chicago, Ill., a corporation of Illinois Original application May 2, 1939, Serial No. 271,314. Divided and this application July 5, 1943, Serial No. 493,534

1 Claim. (Cl. 236—34)

This invention relates to a thermostatic liquid controlling device and has for its object to provide a new and improved system of this description.

The invention has as a further object to provide a thermostatic liquid controlling device particularly adapted for use where the valve controlled by the thermostat has pressure applied upon it by a pump or other means.

The invention has as a further object to provide a thermostatic liquid controlling device particularly adapted to be used in a bypass.

The invention has further objects which are more particularly pointed out in the accompanying description.

This application is a division of my application Serial Number 271,314, filed May 2, 1939, now Patent No. 2,327,342 issued August 24, 1943.

Referring now to the drawings,

Fig. 1 is a view showing one form of device embodying the invention.

Fig. 2 is an enlarged sectional view taken on line II—II.

Fig. 3 is a view showing the member for changing the area of the passageway through the thermostatic housing.

Like numerals refer to like parts throughout the several figures.

Referring now to the drawings, there is illustrated a thermostatic liquid controlling device comprising a housing 10, having an inlet 9. Within the housing 10 is a thermostat 11 which controls a valve 12. This valve is normally open but is closed when the temperature in the housing 10 rises to a predetermined point. This thermostat is a reverse acting thermostat. That is, instead of acting when the temperature rises to a predetermined point to open the valve, it acts when the temperature rises to a predetermined point to close the valve. The housing 10, which houses the thermostat 11, has a separable part or section 13. This section preferably has a flange 14 and the other part of the housing has a similar flange 15 and the two flanges are connected together by the bolts or fastening devices 16. The thermostat may be of any design or kind and for the purposes of illustration, I have shown a thermostat consisting of a coil of bimetal in a casing 17, which has a flange 18 which is clamped between the flanges 14 and 15. The valve 12 is pivoted in this casing at 19.

Connected with one end of the housing 10 is an inlet tube 20 which discharges into a passageway 21 in the housing, and which is preferably provided for varying the cross sectional area of this passageway to adapt the thermostatic housing for different conditions and for engines of different sizes. For this purpose there is provided a removable ring 22 which is fastened in position by the fastening devices 23 and is located opposite the discharge end of the inlet tube 20. The inlet tube 20 may also be varied as desired, as it is removably connected in position in the housing, so that a tube of any size or shape may be used. The ring 22 preferably has a curved inner face 26.

The housing 10 is provided with a main outlet 24 at the end thereof. The thermostatic housing 10 has a second outlet 29 which is located preferably opposite the inlet pipe 20, so that the inlet pipe 20, when the valve 12 is open, will discharge the water past it into the housing 10. The device, when in use, is connected up with the other parts with which it is designed to operate.

The use and operation of my invention are as follows:

When the device is connected with the parts with which it is used, the heated liquid enters the inlet 9 and it is discharged through the inlet pipe 20 and the inlet passageway 21 and through the thermostatic housing 10. Since the valve 12 is normally open, this liquid then passes out of the outlet 24 of the thermostatic housing to the point desired. The inlet tube construction insures the water being moved past the outlet 29.

When the liquid, passing through the thermostatic housing 10, reaches a predetermined temperature, depending upon conditions present, the valve 12 closes and this causes the liquid to pass out of the second outlet 29 to be either discharged or conducted to any desired point.

When the liquid passing through the inlet 9 and through the inlet pipe 20 into the thermostatic housing 10 is lowered to a predetermined temperature, this liquid, coming into contact with the thermostat 11 causes the thermostat to open the valve 12 so that this liquid then passes out of the outlet 24 instead of the outlet 29.

It will thus be seen that when this particular construction is used in a bypass, there is provided a bypass which is normally open and which has connected with it an overflow discharge which is at all times open. It will further be seen that the inlet tube in conjunction with the ring 22, under normal operating conditions, substantially prevents the liquid from flowing through the continuously open outlet 29 until the temperature of the liquid reaches a predetermined point. At this point the thermostat closes the valve 12 and the heated liquid passes out through the continuously open discharge 29. In order to adapt the device for varying conditions, I am able to use the same size housing 10 for the thermostat and the valve for these different conditions. This is accomplished by providing the means for adjusting the passage between the inlet tube and the ring 22 as herein shown, wherein the ring 22 can be made of different sizes and any one of these sizes can be easily and quickly placed in the housing.

The inlet tube 20 may have a small opening 20a if desired, and when this opening is used, it provides a small circulation of liquid through the continuously open outlet 29.

I claim:

A thermostatic liquid controlling device comprising a casing having an inlet at one end thereof and an outlet near said inlet, a tube connected with said inlet and projecting into said casing and past said outlet, said casing having a second outlet member removably mounted at the other end thereof, a valve for controlling said second outlet, a thermostat in the casing operatively connected with said valve and in the path of the liquid leaving said inlet tube, a restrictor annulus in the casing between the discharge end of said inlet tube and the first mentioned outlet for restraining return of fluid past the tube until the valve has substantially closed the second outlet, and means connecting the valve and thermostat for insertion, mounting and removal as a single unit in the casing in longitudinal alignment with the inlet tube and said second outlet member.

HAROLD B. DRAPEAU.

REFERENCES CITED

The following references are of record in the file of this patent:

UNITED STATES PATENTS

| Number | Name | Date |
|---|---|---|
| 1,031,289 | Pedley | July 2, 1912 |
| 1,784,242 | Melton | Dec. 9, 1930 |
| 1,868,621 | Wolff | July 26, 1932 |
| 1,902,858 | Jorgensen et al. | Mar. 28, 1933 |
| 2,041,928 | Hild | May 26, 1936 |
| 2,065,148 | Nallinger | Dec. 22, 1936 |
| 2,075,521 | Hild | Mar. 30, 1937 |
| 2,216,015 | Lund | Sept. 24, 1940 |

FOREIGN PATENTS

| Number | Country | Date |
|---|---|---|
| 542,823 | Germany | Jan. 30, 1932 |
| 595,852 | Germany | Apr. 23, 1934 |